US012671324B2

(12) United States Patent
Yaqoob

(10) Patent No.: US 12,671,324 B2
(45) Date of Patent: Jun. 30, 2026

(54) MULTI-MODE CONTROL BASED SERIES-RESONANT DC-DC POWER CONVERTER

(71) Applicant: Huawei Digital Power Technologies Co., Ltd., Shenzhen (CN)

(72) Inventor: Muhammad Yaqoob, Kista (SE)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 191 days.

(21) Appl. No.: 18/659,348

(22) Filed: May 9, 2024

(65) Prior Publication Data

US 2024/0297578 A1 Sep. 5, 2024

Related U.S. Application Data

(63) Continuation of application No. PCT/EP2021/081015, filed on Nov. 9, 2021.

(51) Int. Cl.
*H02M 3/335* (2006.01)
*H02M 3/00* (2006.01)

(52) U.S. Cl.
CPC ......... *H02M 3/01* (2021.05); *H02M 3/33571* (2021.05); *H02M 3/33584* (2013.01)

(58) Field of Classification Search
CPC .... H02M 3/01; H02M 3/015; H02M 3/33571; H02M 3/33584; H02M 3/33573; H02M 3/33576
See application file for complete search history.

(56) References Cited

U.S. PATENT DOCUMENTS

| | | | | |
|---|---|---|---|---|
| 2015/0062971 A1* | 3/2015 | Ye | ..................... | H02M 3/33573 |
| | | | | 363/17 |
| 2016/0352236 A1* | 12/2016 | Yoo | ................... | H02M 3/33584 |
| 2021/0099096 A1 | 4/2021 | Escudero Rodriguez et al. | | |

FOREIGN PATENT DOCUMENTS

| | | |
|---|---|---|
| CN | 111030464 A | 4/2020 |
| WO | 2021071708 A1 | 4/2021 |

OTHER PUBLICATIONS

Awasthi et al.,"Analysis of a Hybrid Variable-Frequency-Duty-Cycle-Modulated Low-Q LLC Resonant Converter for Improving the Light-Load Efficiency for a Wide Input Voltage Range", IEEE Transactions on Power Electronics, Jul. 2021, vol. 36, No. 7, pp. 8476-8493.

(Continued)

*Primary Examiner* — Alex Torres-Rivera
(74) *Attorney, Agent, or Firm* — Maier & Maier, PLLC

(57) ABSTRACT

A bi-directional series-resonant DC-DC power converter apparatus incorporating an improved multi-mode controller eliminates burst mode operation while supporting a wide voltage range handling capability. The converter includes a half bridge switching network and a full bridge switching network coupled together with a series resonant impedance including an inductor, a capacitor, and a transformer. Under normal and heavy load conditions, a controller regulates the converter output by varying the switching frequency of a half bridge and a full bridge switching network. The converter phase shift ensures ZVS operation based on a converter gain. Under light loading, the switching frequency will exceed a pre-determined maximum frequency and a second control mode is employed where the switching frequency is set to the maximum frequency and converter output is regulated by using a feedback control loop to vary the phase shift and duty cycle of the two switching networks.

18 Claims, 6 Drawing Sheets

100

(56)     References Cited

OTHER PUBLICATIONS

Shafiei et al.,"Burst Mode Elimination in High-Power LLC Resonant Battery Charger for Electric Vehicles", IEEE Transactions on Power Electronics, Feb. 2016, vol. 31, No. 2, pp. 1173-1188.

Yaqoob et al.,"Modeling the Effect of Dead-Time on the Soft-Switching Characteristic of Variable-Frequency Modulated Series-Resonant DAB Converter", 2017 IEEE, 8 pages.

Hiltunen et al.,"Variable-Frequency Phase Shift Modulation of a Dual Active Bridge Converter", IEEE Transactions on Power Electronics, Dec. 2015, vol. 30, No. 12, pp. 7138-7148.

* cited by examiner

600

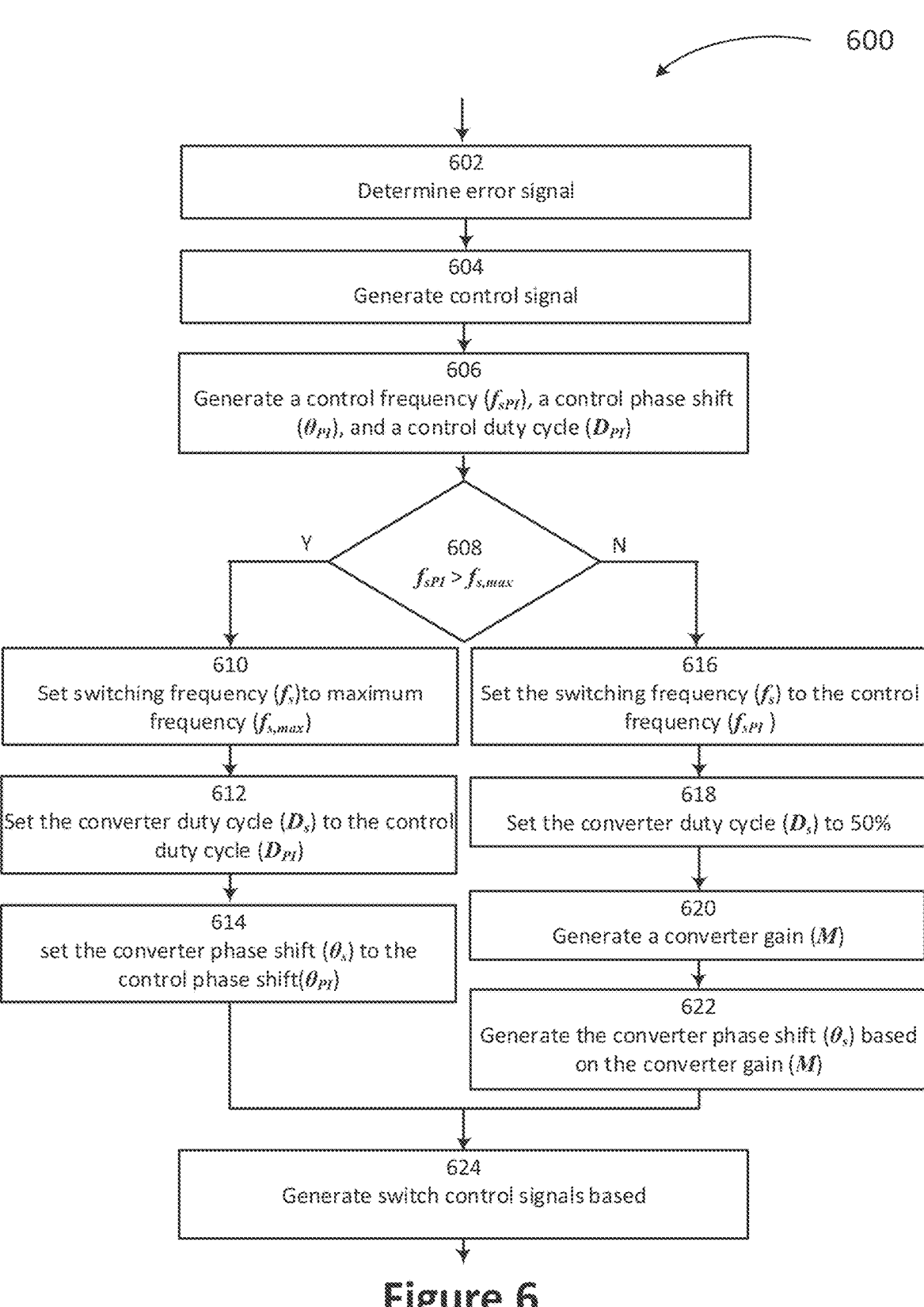

602
Determine error signal

604
Generate control signal

606
Generate a control frequency ($f_{sPI}$), a control phase shift ($\theta_{PI}$), and a control duty cycle ($D_{PI}$)

608
$f_{sPI} > f_{s,max}$

Y

N

610
Set switching frequency ($f_s$)to maximum frequency ($f_{s,max}$)

616
Set the switching frequency ($f_s$) to the control frequency ($f_{sPI}$)

612
Set the converter duty cycle ($D_s$) to the control duty cycle ($D_{PI}$)

618
Set the converter duty cycle ($D_s$) to 50%

614
set the converter phase shift ($\theta_s$) to the control phase shift($\theta_{PI}$)

620
Generate a converter gain ($M$)

622
Generate the converter phase shift ($\theta_s$) based on the converter gain ($M$)

624
Generate switch control signals based

Figure 6

MULTI-MODE CONTROL BASED SERIES-RESONANT DC-DC POWER CONVERTER

CROSS-REFERENCE TO RELATED APPLICATIONS

This application is a continuation of International Application No. PCT/EP2021/081015, filed on Nov. 9, 2021, the disclosure of which is hereby incorporated by reference in its entirety.

TECHNICAL FIELD

The aspects of the embodiments relate to power conversion apparatuses and to control methodologies for bi-directional series resonant DC-DC power converters.

BACKGROUND

DC to DC power converters are used in many of today's power systems. Conventional DC-DC converter stages employ burst mode to handle low power operation. Burst mode can create unacceptable ripple and EMI that exceeds regulatory requirements. When the DC-DC stage is sized to handle overvoltage operation, the burst mode operating range can extend above low power operation and into the converter's medium operating range thereby exacerbating the drawbacks of burst mode.

Control methods based on an internal phase shift or duty cycle variation rely on an LLC based DC-DC converter topology which lacks the wide range voltage variation handling capability and does not support bi-directional power flow. Dual active bridge topology solutions lack burst mode elimination which leads to high voltage stresses when required power is more than the rated power.

Efficient control has been achieved for full-bridge type series resonant DC-DC converters. However, these solutions require burst mode to achieve low power levels, and when the impedance network is sized to handle desired over power conditions, the burst mode region can extend into the mid power level operating range with the above-described drawbacks.

Thus, there is a need for improved directional series-resonant DC-DC power converters that can efficiently handle the desired wide-range voltage variations and eliminate burst mode operation for reliable converter operation when sized to handle over power conditions. Accordingly, it would be desirable to provide an apparatus that addresses at least some of the problems described above.

SUMMARY

The aspects of the embodiments are directed to a multi-mode control-based series-resonant DC-DC power converter apparatus incorporating an improved multi-mode controller configured to eliminate burst mode operation while supporting a wide voltage range handling capability. The aspects of the embodiments achieve efficient reliable performance while avoiding the drawbacks of burst mode operation at lower current values.

According to a first aspect, the above and further objectives and advantages are obtained by an apparatus. In one embodiment, the apparatus includes a series resonant circuit composed of a series connected inductor, capacitor, and a primary winding of a transformer. A half bridge switching circuit is coupled between the series resonant circuit and a first DC voltage, and a full bridge switching circuit is coupled between a secondary winding of the transformer and a second DC voltage. The apparatus includes a controller configured to receive the first DC voltage and the second DC voltage, and produce switch control signals, where the switch control signals are configured to operate the first switching network and the second switching network to transfer power between the first DC voltage and the second DC voltage. The controller is configured to subtract a controlled voltage from a reference voltage to produce an error signal, where the controlled voltage is one of the first DC voltage and the second DC voltage, apply a control algorithm to the error signal to produce a control signal, generate a control frequency, a control duty cycle, and a control phase shift, based on the control signal, and generate the switch control signals based on a switching frequency, a converter phase shift, and a converter duty cycle. When the control frequency is greater than a predetermined maximum switching frequency, the controller is further configured to set the switching frequency equal to the maximum switching frequency, set the converter phase shift to the control phase shift, and set the converter duty cycle to the control duty cycle.

In a possible implementation form, the controller duty cycle is less than fifty percent. Adjusting the controller duty cycle avoids the use of burst mode operation during certain converter operating conditions.

In a possible implementation form, when power is flowing from the first DC voltage to the second DC voltage, the controlled voltage is set equal to the second DC voltage, and when power is flowing from the second DC voltage to the first DC voltage, the controlled voltage is set equal to the first DC voltage and the converter phase shift is inverted. Operating the controller in this fashion allows for efficient bi-directional power flow using the same multi-mode control scheme for both directions.

In a possible implementation form, the control algorithm includes a proportional plus integral control algorithm. A PI control algorithm provides good desirable performance with a predictable and easily implemented control algorithm.

In a possible implementation form, the controller is configured to generate the control frequency, the control duty cycle, and the control phase shift, by applying one or more linear functions to the control signal. Generating all the control variables from the same control signal allows both control modes to be regulated with a single control loop and control algorithm.

In a possible implementation form, the controller is configured to determine a control algorithm gain based on a comparison between the control frequency and the maximum switching frequency. Varying the control loop gain based on the control mode provides a simple and easily implemented method of tailoring the control loop for both operating modes.

In a possible implementation form, the controller is configured to generate a converter gain based on the first DC voltage, the second DC voltage, and a turns ratio of the transformer. When the control frequency is less than the maximum switching frequency, set the switching frequency equal to the control frequency, set the converter duty cycle to fifty percent, and generate the converter phase shift based on the converter gain. This control mode ensures zero voltage switching (ZVS) operation during medium and high-power operation of the converter.

In a possible implementation form, when the converter gain is less than a predetermined maximum gain, the converter phase shift is set to an inverse cosine of the converter gain. Setting the phase shift with this function ensures ZVS operation of the converter.

In a possible implementation form, the maximum gain is determined based on a dead time of the high voltage switching network, a charge stored in an output capacitance of a high voltage side switch, and a minimum low voltage side output current necessary to provide zero voltage switching. Selecting the maximum gain based on these values ensures ZVS operation of the HV-side switches.

According to a second aspect, the above and further objects and advantages are obtained by a method for operating a multi-mode control-based series-resonant DC-DC power converter apparatus. In one embodiment the apparatus includes a series resonant circuit where the series resonant circuit is composed of a series connected inductor, capacitor, and a primary winding of a transformer. The apparatus further includes a half bridge switching circuit coupled between the series resonant circuit and a first DC voltage, and a full bridge switching circuit coupled between a secondary winding of the transformer and a second DC voltage. In the embodiment the method includes generating an error signal by subtracting a controlled voltage from a reference voltage, where the controlled voltage is one of the first DC voltage, and the second DC voltage, generating a control signal by applying a control algorithm to the error signal, generating a control frequency, a control duty cycle, and a control phase shift, based on the control signal, and comparing the control frequency to a predetermined maximum switching frequency. When the control frequency is greater than the predetermined maximum switching frequency, the method includes setting a converter switching frequency equal to the maximum switching frequency, setting the converter phase shift to the control phase shift, setting the converter duty cycle to the control duty cycle, and generating switch control signals based on the switching frequency, the converter phase shift, and the converter duty cycle. The switch control signals are configured to operate the first switching network and the second switching network to transfer power between the first DC voltage and the second DC voltage.

In a possible implementation form, when power is flowing from the first DC voltage to the second DC voltage, the method includes setting the controlled voltage equal to the second DC voltage, and when power is flowing from the second DC voltage to the first DC voltage, the method includes setting the controlled voltage to the first DC voltage and inverting the converter phase shift. These steps allow the same control method to provide bi-directional power flow using the same basic control scheme.

In a possible implementation form, the control algorithm includes a proportional plus integral (PI) control algorithm. A PI control algorithm provides good desirable performance with a predictable and easily implemented control algorithm.

In a possible implementation form, the control algorithm includes a control algorithm gain, and the method includes determining a control algorithm gain based on a comparison between the control frequency and the maximum switching frequency. Varying the control loop gain based on the control mode provides a simple and easily implemented method of tailoring the control loop for both operating modes.

In a possible implementation form, when the control frequency is less than the predetermined maximum switching frequency, the method includes setting the switching frequency equal to the control frequency, setting the converter duty cycle to fifty percent, generating a converter gain based on the first DC voltage, the second DC voltage, and a turns ratio of the transformer, and generating the converter phase shift based on the converter gain. This control mode ensures ZVS operation during medium and high-power operation of the converter.

In a possible implementation form the method further includes determining a maximum gain based on a deadtime of the high voltage switching network, a charge stored in an output capacitance of a high voltage side switch, and a minimum low voltage side output current necessary to provide zero voltage switching. When the converter gain is less than a maximum gain, the method generates the converter phase shift based on an inverse cosine of the converter gain. Setting the phase shift with this function ensures ZVS operation of the converter.

These and other aspects, implementation forms, and advantages of the exemplary embodiments will become apparent from the embodiments described herein considered in conjunction with the accompanying drawings. It is to be understood, however, that the description and drawings are designed solely for purposes of illustration and not as a definition of the limits of the embodiments. Additional aspects and advantages of the embodiments will be set forth in the description that follows, and in part will be obvious from the description, or may be understood by practice of the embodiments.

BRIEF DESCRIPTION OF DRAWINGS

In the following, the embodiments will be explained in more detail with reference to the drawings, in which like references indicate like elements and:

FIG. 6 illustrates a flow chart of an exemplary method for operating a bi-directional series-resonant DC-DC power converter incorporating aspects of the embodiments.

DETAILED DESCRIPTION OF EMBODIMENTS

Figure 1:
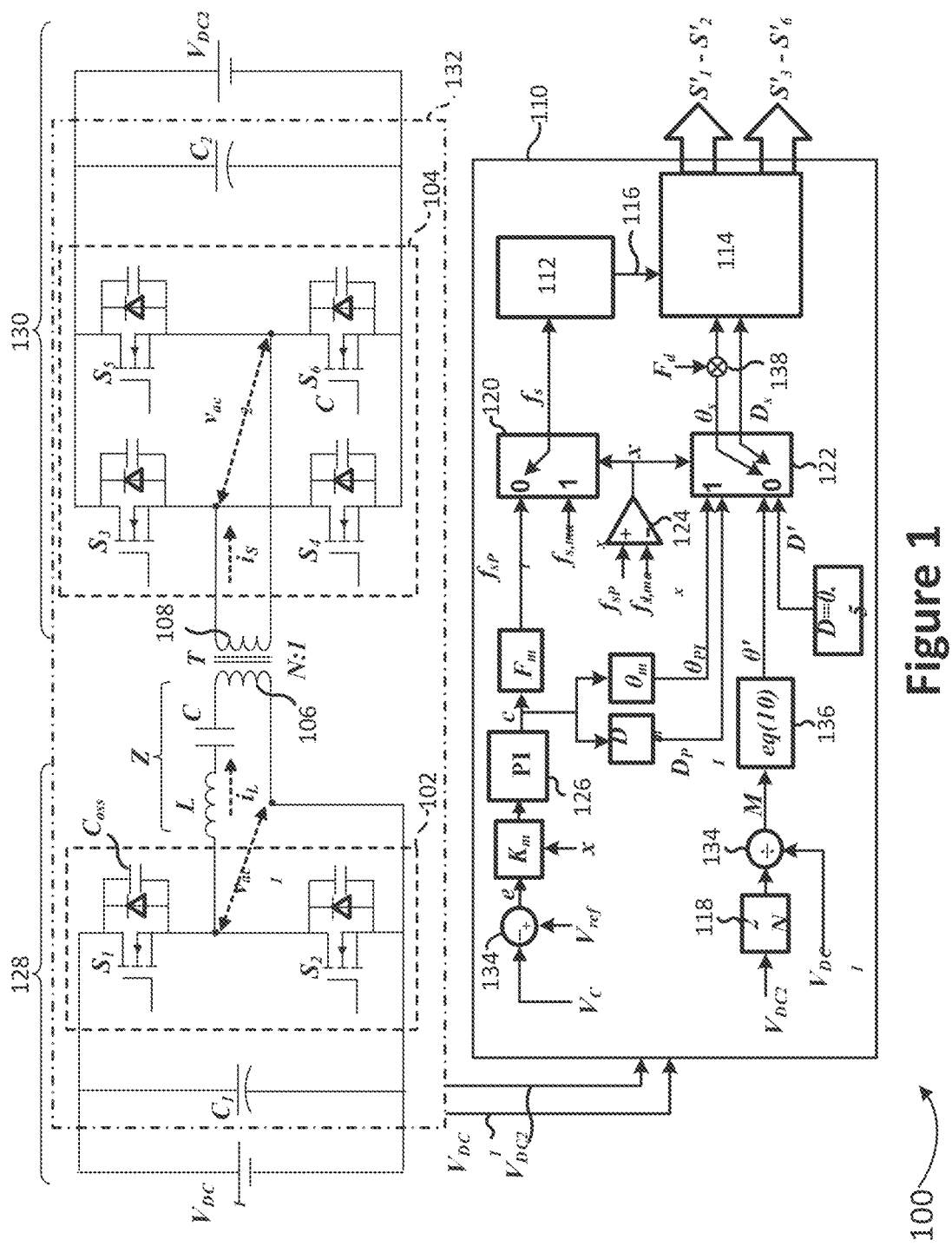
FIG. 1 illustrates a diagram of an exemplary bi-directional series-resonant DC-DC power converter apparatus employing a multi-mode controller incorporating aspects of the embodiments.

Referring to FIG. 1, a schematic block diagram of an exemplary series-resonant DC-DC power converter apparatus 100 employing a multi-mode controller 110 is illustrated. The exemplary apparatus 100 of the embodiments is directed to an improved series-resonant DC-DC power conversion apparatus 100 incorporating an improved multi-mode controller 110 configured to eliminate burst mode operation while supporting a wide voltage range handling capability. The apparatus 100 is appropriate for use as a DC-DC conversion stage in power conversion systems such as AC-DC rectifier systems used to convert grid power to conditioned DC power for powering telecom equipment, or DC-AC inverter systems used to convert DC power to AC power as used in photovoltaic systems.

As is illustrated in FIG. 1, in one embodiment, the apparatus 100 includes a series resonant circuit (Z). In one embodiment, the series resonant circuit (Z) includes a series connected inductor (L), capacitor (C), and a primary winding 106 of a transformer (T). A half bridge switching circuit 102 is coupled between the series resonant circuit (Z) and a first DC voltage ($V_{DC1}$). A full bridge switching circuit 104 is coupled between a secondary winding 108 of the transformer (T) and a second DC voltage ($V_{DC2}$).

In one embodiment, a controller 110 is configured to receive the first DC voltage ($V_{DC1}$), the second DC voltage ($V_{DC2}$), and produce switch control signals ($S'_1$, $S'_2$, $S'_3$, $S'_4$, $S'_5$, $S'_6$). The switch control signals ($S'_1$, $S'_2$, $S'_3$, $S'_4$, $S'_5$, $S'_6$) are configured to operate the first switching network 102 and the second switching network 104 to transfer power between the first DC voltage ($V_{DC1}$) and the second DC voltage ($V_{DC2}$).

In one embodiment, the controller 110 is configured to subtract a controlled voltage ($V_C$) from a reference voltage ($V_{ref}$) to produce an error signal (e). The controlled voltage is one of the first DC voltage ($V_{DC1}$) and the second DC voltage ($V_{DC2}$).

The controller 110 is also configured to apply a control algorithm 126 to the error signal (e) to produce a control signal (c), generate a control frequency ($f_{sPI}$), a control duty cycle ($D_{PI}$), and a control phase shift ($\theta_{PI}$), based on the control signal (c). The controller 110 is configured to generate the switch control signals ($S'_1$, $S'_2$, $S'_3$, $S'_4$, $S'_5$, $S'_6$) based on a switching frequency ($f_s$), a converter phase shift ($\theta_s$), and a converter duty cycle ($D_s$).

In one embodiment, when the control frequency $f_{sPI}$ is greater than a predetermined maximum switching frequency $f_{s,max}$, the controller 110 is further configured to set the switching frequency $f_s$ equal to the maximum switching frequency $f_{s,max}$; set the converter phase shift $\theta_s$ to the control phase shift $\theta_{PI}$, and set the converter duty cycle $D_s$ to the control duty cycle $D_{PI}$.

In one embodiment, the apparatus 100 includes a series-resonant DC-DC power converter topology 132. The series-resonant DC-DC power converter topology 132 has the half bridge switching network 102 on the high voltage (HV) side 128 of the converter topology 132 configured to couple with the first DC voltage $V_{DC1}$, and the full bridge switching network 104 on the low voltage (LV) side 130 of the converter topology 132 configured to couple with the second DC voltage $V_{DC2}$.

The half bridge switching network 102 is coupled to the full bridge switching network 104 through the series resonant circuit Z and the transformer T. The series resonant circuit Z includes the inductor L, the capacitor C, and the primary winding 106 of the transformer T connected in series. A secondary winding 108 of the transformer T is coupled to the full bridge switching network 104. In one embodiment, the transformer T has a turns ratio between the primary winding 106 and the secondary winding 108 of N to one, N:1.

The half bridge switching network 102 is configured to convert between the first DC voltage $V_{DC1}$ and a first AC voltage $v_{ac1}$, and the full bridge switching network 104 is configured to convert between the second DC voltage $V_{DC2}$ and a second AC voltage $v_{ac2}$. The impedance Z and transformer couple the two AC voltages $v_{ac1}$, $v_{ac2}$. Connecting the capacitor C in series with the inductor L and the primary winding 106 removes the DC bias created by the half bridge switching network 102 on the HV-side 128.

Two series connected switching devices $S_1$, $S_2$ form the half bridge switching network 102, and four switching devices $S_3$, $S_4$, $S_5$, $S_6$ configured in an H-bridge form the full bridge switching network 104. In the exemplary apparatus 100 the switching devices $S_1$, $S_2$, $S_3$, $S_4$, $S_5$, $S_6$ are implemented with metal oxide semiconductor field effect transistors (MOSFET) however, any suitable switching device capable of switching the desired power at the desired frequencies may be advantageously employed without straying from the spirit and scope of the embodiments. As used herein a switch or switching device is referred to as "on" or "turned on" when it is conducting current and a switch or switching device is referred to as "off" or "turned off" when it is not conducting current.

When desired a first link capacitor $C_1$ may be coupled in parallel with the first DC voltage $V_{DC1}$ and a second link capacitor $C_2$ may be coupled with the second DC voltage $V_{DC2}$ to provide power conditioning at the input and output of the converter topology 132.

A controller 110 is coupled to the converter topology 132 and configured to receive the first DC voltage $V_{DC1}$, and the second DC voltage $V_{DC2}$, and to produce a set of switch control signals $S'_1$, $S'_2$, $S'_3$, $S'_4$, $S'_5$, $S'_6$, where each switch control signal $S'_1$, $S'_2$, $S'_3$, $S'_4$, $S'_5$, $S'_6$ is coupled to a respective one of the switching devices $S_1$, $S_2$, $S_3$, $S_4$, $S_5$, $S_6$. The controller adapts the switch control signals $S'_1$, $S'_2$, $S'_3$, $S'_4$, $S'_5$, $S'_6$ to appropriately operate, i.e. turn on and turn off, each switching device $S_1$, $S_2$, $S_3$, $S_4$, $S_5$, $S_6$ to control power flow through the converter topology 132 and transfer power between the first DC voltage $V_{DC1}$ and the second DC voltage $V_{DC2}$. In certain embodiments it may be beneficial to employ gate drivers between the controller 110 and the switching networks 102, 104 to amplify and isolate the switch control signals $S'_1$, $S'_2$, $S'_3$, $S'_4$, $S'_5$, $S'_6$.

The controller 110 is configured to adapt switch control signals $S'_1$, $S'_2$, $S'_3$, $S'_4$, $S'_5$, $S'_6$ to regulate an output voltage of the converter topology 132 based on a reference voltage $V_{ref}$, where the reference voltage corresponds to a desired output of the apparatus 100. The output of the converter topology 132 may be either the first DC voltage $V_{DC1}$ or the second DC voltage $V_{DC2}$ depending on the desired direction of power flow. Regulation of the output voltage is achieved by the controller 110 using a feedback control loop 134 configured to compare a controlled voltage $V_C$ with the reference voltage $V_{ref}$. The controlled voltage $V_C$ corresponds to the desired converter output voltage which may be either the first DC voltage $V_{DC1}$ or the second DC voltage $V_{DC2}$, and the reference voltage $V_{ref}$ is a set point or signal that corresponds to a desired converter output voltage.

The exemplary controller 110 is configured to support bi-directional power flow based on a single control strategy. To reverse the direction of power flow, the control voltage is $V_C$ is swapped between the first DC voltage $V_{DC1}$ and the second DC voltage $V_{DC2}$, and the converter phase shift may be inverted by multiplying 138 the converter phase shift $\theta_s$ by a flow direction signal $F_d$ where the direction signal has a value of plus or minus one ±1. As an aid to understanding, positive or forward power flow is defined as power flowing from the first DC voltage $V_{DC1}$ to the second DC voltage $V_{DC2}$. To achieve forward power flow the controlled voltage $V_C$ is set to the second DC voltage $V_{DC2}$, and the flow direction signal $F_d$ has a value of positive one (+1). For reverse power flow the controlled voltage $V_C$ is set to the first DC voltage $V_{DC1}$, and the flow direction signal $F_d$ has a value of negative one (−1) thereby inverting the converter phase shift $\theta_s$.

The control loop 134 subtracts the controlled voltage $V_C$ from the reference voltage $V_{ref}$ to produce an error signal e. A control loop gain $K_m$ and a control algorithm 126 are applied to the error signal e to produce a control signal c, and the control signal c is then used to generate a control frequency $f_{sPI}$, a control duty cycle $D_{PI}$, and a control phase shift $\theta_{PI}$, by applying a respective linear operation $F_m$, $D_m$, $\theta_m$ to the control signal c. In certain embodiments it may be desirable to select different values for the control loop gain $K_m$ based on a mode signal x, where the mode signal x represents an operating mode of the controller.

The controller 110 operating mode is determined based on the control frequency $f_{sPI}$ and a pre-determined maximum switching frequency $f_{s,max}$. The control frequency $f_{sPI}$ is compared 124 to the pre-determined maximum switching frequency $f_{s,max}$ to produce the mode signal x. When the control frequency $f_{sPI}$ is less than the pre-determined maximum switching frequency $f_{s,max}$m the mode signal x is set to false or a logic zero and the controller operates in a first operating mode, also referred to herein as Mode 1. When the control frequency $f_{sPI}$ is greater than or equal to the pre-determined maximum switching frequency $f_{s,max}$. the mode signal x is set to true or a logic 1 and the controller operates in a second operating mode, also referred herein as Mode 2.

When operating in Mode 1, the converter switching frequency $f_s$ is set to the control frequency $f_{sPI}$ and the converter output is regulated by varying the converter switching frequency $f_s$. Both the half bridge switching network 102 and the full bridge switching network 104 operate at the same converter switching frequency $f_s$, and the converter switching frequency $f_s$ is selected 120 in the exemplary controller 110 based on the operating mode as represented by the mode signal x.

When operating in Mode 2, the converter switching frequency $f_s$ is set to the pre-determined maximum switching frequency $f_{s,max}$ and the converter output is regulated based on a control duty cycle $D_{PI}$, and a control phase shift $\theta_{PI}$. In the exemplary controller 110 the control duty cycle $D_{PI}$, and control phase shift $\theta_{PI}$ are selected 122 as the converter phase shift $\theta_s$, and a converter duty cycle $D_s$ when the mode signal x indicates the converter is operating in Mode 2.

The switching frequency $f_s$ generated by the controller is converted to an operating signal 116 with a voltage-controlled oscillator 112 where the operating signal 116 may be a triangle wave, sawtooth wave, or other desired operating signal 116 appropriate for generating switch control signals $S'_1$, $S'_2$, $S'_3$, $S'_4$, $S'_5$, $S'_6$ having a primary frequency of the switching frequency $f_s$. The operating signal 116 is provided, along with a converter phase shift $\theta_s$, and a converter duty cycle $D_s$ to a phase shift and duty cycle generation stage 114 to generate switch control signals $S'_1$, $S'_2$, $S'_3$, $S'_4$, $S'_5$, $S'_6$ configured to operate the half bridge switching network 102 and the full bridge switching network 104.

While operating in Mode 1 the exemplary controller 110 sets 122 the converter duty cycle $D_s$ to a fixed duty cycle D' and sets the converter phase shift $\theta_s$ to a Mode 1 phase shift $\theta'$. As will be discussed further below, the Mode 1 phase shift $\theta'$ is generated 136 based on the converter gain M, where the converter gain M is determined by multiplying 118 the second DC voltage $V_{DC2}$ by twice the transformer turns ratio N, and dividing 134 by the first DC voltage $V_{DC1}$.

Figure 2:
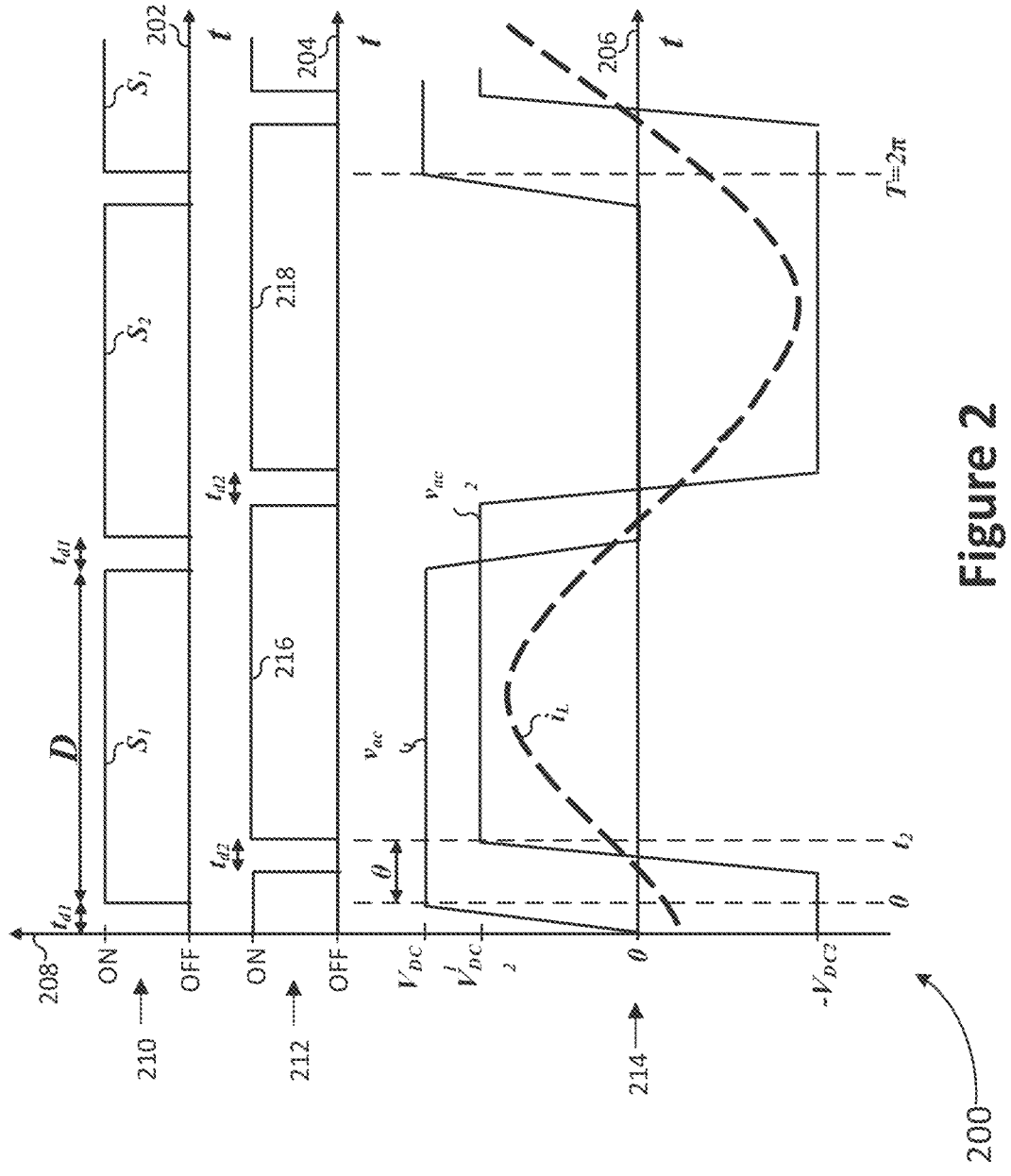
FIG. 2 illustrates graphs showing key operating waveforms of an exemplary series-resonant DC-DC power converter topology during a first operating mode with power flow from the high voltage (HV)-side to the low voltage (LV)-side incorporating aspects of the embodiments.

FIG. 2 illustrates graphs 200 showing key operating waveforms of an exemplary series-resonant DC-DC power converter topology 132 during a first operating mode with power flow from the HV-side 128 to the LV-side 130 of the converter. In the graphs 200, time is depicted along the horizontal axes 202, 204, 206 increasing to the right and signal magnitude is depicted along the vertical axis 208 increasing upwards. The ON and OFF state of switching devices $S_1$ and $S_2$ of the half bridge switching network 102 are depicted in graph 208, and the ON and OFF state of switching devices $S_3$, $S_4$, $S_5$, and $S_6$ of the high frequency switching network 104 are depicted in graph 210, where 216 represents the on state of switching devices $S_3$ and $S_6$ and 218 represents the on state of switching devices $S_4$ and $S_5$.

Graph 214 depicts the first AC voltage $v_{ac1}$, the second AC voltage $v_{ac2}$, and the inductor current $i_L$ during one full cycle of the switching networks where the cycle is depicted along the time axis 206 between time 0 and T. The first AC voltage $v_{ac1}$ is generated by the half bridge switching network 102 and varies between zero and the first DC voltage $V_{DC1}$, while the second AC voltage $v_{ac2}$ varies between plus and minus the second DC voltage $V_{DC2}$.

The graphs 200 illustrate converter operation during Mode 1 where currents are sufficient to support zero voltage switching (ZVS) operation of the HV-side 128 switching devices $S_1$, $S_2$. During Mode 1, the AC voltages $v_{ac1}$, $v_{ac2}$ generate near sinusoidal current $i_L$ by exciting the series-resonant impedance Z, as shown in graph 214. Having near sinusoidal currents leads to lower current stress and lower high-order harmonics yielding lower conduction and core losses in the transformer T and inductor L. During Mode 1 operation the switching networks 102, 104 operate with near fifty percent duty cycle D=50%, i.e., near equal ON and OFF times as shown in graphs 210 and 212. During Mode 1 operation the first AC voltage $v_{ac1}$ varies between zero volts and $+V_{DC1}$ volts, while the second AC voltage $v_{ac2}$ swings between $-V_{DC2}$ and $+V_{DC2}$ volts.

As an aid to understanding, the following analysis assumes a forward power flow, where power is flowing from the first DC voltage $V_{DC1}$ to the second DC voltage $V_{DC2}$. It should be understood that the same analysis applies equally well to reverse power flow where the controlled voltage $V_C$ is swapped and the flow signal $F_d$ is inverted as described above.

Applying fundamental component analysis to the converter topology 132, shows the average power $P_{o2}$ and current $I_{o2}$ at the LV-side 130 as given by equation (1) and equation (2):

$$P_{o2} = \frac{2V_{DC1}^2 M \sin\theta}{\pi^2 Z}, \tag{1}$$

$$I_{o2} = \frac{4N V_{DC1} \sin\theta}{\pi^2 Z}, \tag{2}$$

where $\theta$ represents the phase shift between the first AC voltage $v_{ac1}$ and the second AC voltage $v_{ac2}$. The phase shift may be varied over the range $-\pi/2 \leq \theta \leq +\pi/2$ where the sign determines the direction of power flow between the first DC voltage $V_{DC1}$ other HV-side 128 and the second DC voltage $V_{DC2}$ or the LV-side 130. A positive phase shift $+\theta$ represents power flow from the HV-side 128 to the LV-side 130, and a negative phase shift $-\theta$ represents power flow from the LV-side 130 to the HV-side 128.

The voltage gain M across the impedance is shown in equation (3):

$$M = \frac{2NV_{DC2}}{V_{DC1}},$$ (3)

and the impedance Z, which is dependent on the switching frequency $f_s$, is shown in equation (4):

$$Z = 2\pi f_s L - \frac{1}{2\pi f_s C}.$$ (4)

Conduction losses in the conversion topology 132 depend primarily on rms values of the inductor current $I_{Lrms}$, which can be calculated as shown in equation (5):

$$I_{Lrms} = \frac{\pi I_{o2} \times \sqrt{2M^2 - 4M\cos\theta + 2}}{4N\sin\theta}.$$ (5)

The minimum rms inductor current $I_{Lrmsmin}$ for a given value of average output current $I_{o2}$ can be found by taking the first derivative of the minimum rms inductor current divided by the average output current $I_{Lrms}/I_{o2}$ with respect to the phase shift $\theta$ and setting it to zero. The result is shown in equation (6):

$$\frac{\partial}{\partial\theta}\left(\frac{I_{Lrms}}{I_{o2}}\right) = 0 \xrightarrow{yields} \theta = \begin{cases} \cos^{-1}M & \text{for } M \le 1 \\ \cos^{-1}\frac{1}{M} & \text{for } M > 1 \end{cases}.$$ (6)

Substituting equation (6) into equation (5) gives a relationship between the minimum rms inductor current $I_{Lrmsmin}$ and the average output current $I_{o2}$ as shown in equation (7):

$$I_{Lrmsmin} = \begin{cases} \dfrac{\pi I_{o2} \times \sqrt{2}}{4N} & \text{for } M \le 1 \\ \dfrac{\pi M I_{o2} \times \sqrt{2}}{4N} & \text{for } M > 1 \end{cases}.$$ (7)

Equation (7) shows that for a gain greater than one M>1, the current increases proportionally with an increase in gain M. An appropriate choice of transformer turns ratio N would be to use equation (3) to select a transformer turns ratio N that keeps the gain M less than or equal to one M≤1. Substituting equation (6) into the output current $I_{o2}$ given by equation (2) yields a relationship for output current as shown in equation (8):

$$I_{o2} = \begin{cases} \dfrac{4NV_{DC1} \times \sqrt{1 - M^2}}{\pi^2 Z} & \text{for } M \le 1 \\ \dfrac{4NV_{DC1} \times \sqrt{1 - \dfrac{1}{M^2}}}{\pi^2 Z} & \text{for } M > 1 \end{cases}.$$ (8)

With a gain equal to one M=1, equation (6) shows the phase shift to be zero $\theta$=0, which from equation (8) produces an output current of zero $I_{o2}$. Operating the converter topology 132 with an output current of zero is problematic and must be avoided. To ensure ZVS, the converter gain M should be limited to some maximum value $M_{max}$ that is both less than one M<1, and produces a large enough output current to maintain ZVS.

Figure 3:
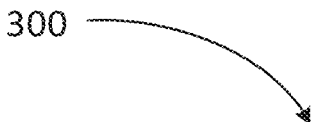
FIG. 3 illustrates a graph showing the relationship between converter gain and converter phase shift incorporating aspects of the embodiments.
Figure 3:
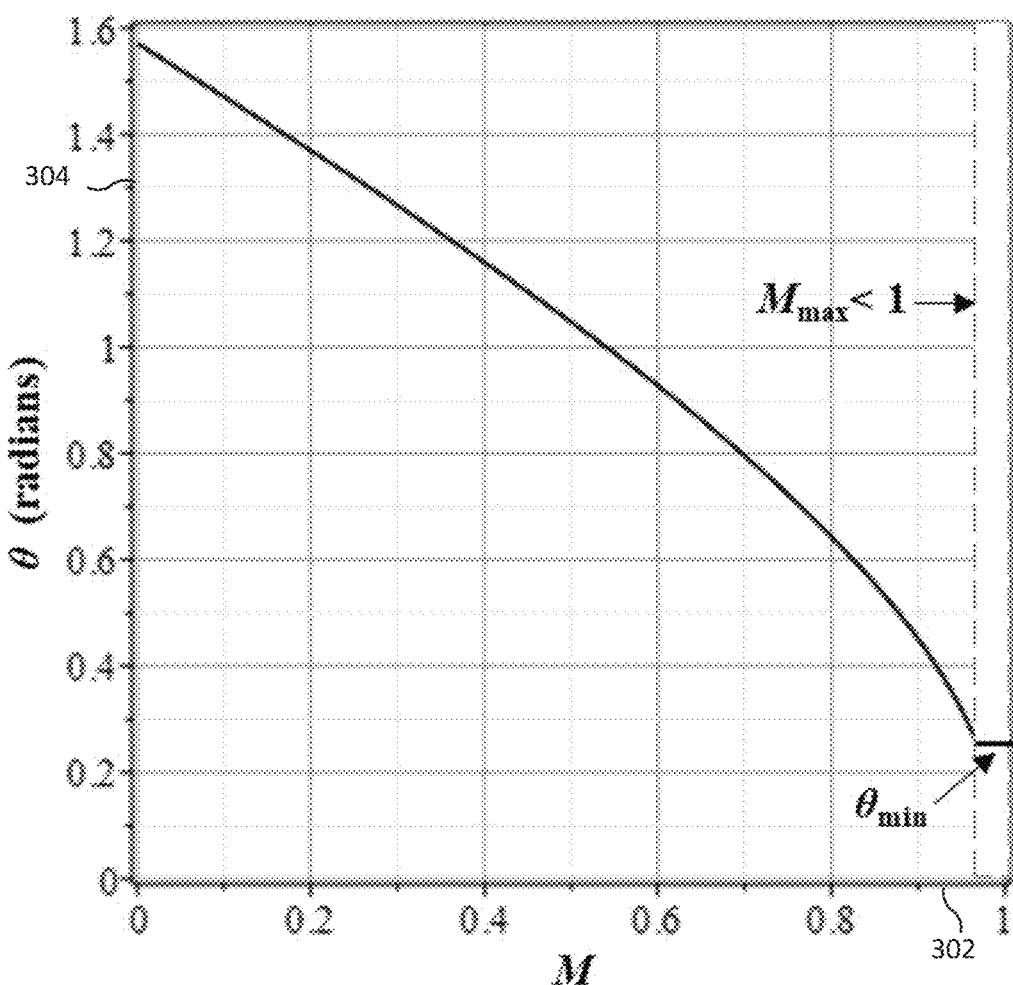

FIG. 3 illustrates a graph 300 showing the relationship between converter gain M and phase shift $\theta$. The relationship plotted in graph 300 is derived above and given by equation (6). In the graph 300, converter gain M is depicted along a horizontal axis 302 increasing to the right, and phase shift $\theta$ is depicted in radians along a vertical axis 304 increasing upwards.

The minimum phase shift $\theta_{min}$ corresponding a maximum converter gain $M_{max}$ is given by equation (9):

$$\theta_{min} = \cos^{-1}M_{max}.$$ (9)

Equation (6) and equation (9) can be combined to form a single relationship as shown in equation (10):

$$\theta = \cos^{-1}M$$ (10)

for $$M < M_{max}.$$

To ensure ZVS operation of the HV-side 128 switching devices $S_1$, $S_2$, the minimum phase shift $\theta_{min}$ must correspond to an inductor current $i_L$ sufficient to remove a charge from the output capacitance $C_{oss}$ of the HV-Side 128 switching devices $S_1$, $S_2$ during the dead time $t_{d1}$. This choice depends on selection of the maximum converter gain $M_{max}$ as shown in equation (11):

$$M_{max} = \frac{\sqrt{(\pi I_{o2,min,zvs}t_{d1})^2 - (4NQ_{1,max})^2}}{\pi I_{o2,min,zvs}t_{d1}},$$ (11)

where $I_{o2,min,zvs}$ is the minimum output current at the LV-side 130 above which ZVS of the HV-side switching devices $S_1$, $S_2$ is guaranteed. ZVS of the LV-side switching devices $S_3$, $S_4$, $S_5$, $S_6$, is guaranteed as shown by equation (10).

As discussed above, the phase shift $\theta$ is bounded by the converter gain M, so the average output current $I_{o2}$ can be varied by changing the impedance Z which varies with the switching frequency $f_s$ as shown in equation (2) and equation (4). Thus, the minimum impedance $Z_{min}$ required to deliver a given maximum output current $I_{o2max}$ can be calculated based on the maximum converter gain $M_{max}$ and minimum input DC voltage $V_{DC1,min}$ as shown in equation (12):

$$Z_{min} = \frac{4NV_{DC1,min} \times \sqrt{1 - M_{max}^2}}{\pi^2 I_{o2,max}} = 2\pi f_{s,min}L - \frac{1}{2\pi f_{s,min}C},$$ (12)

where $V_{DC1,min}$ is the given minimum input voltage, and $f_{s,min}$ is the given minimum switching frequency. To behave inductively the resonance frequency $f_r$ should be less than the minimum switching frequency $f_{s,min}$, where the resonant frequency is given by equation (13):

$$f_r = \frac{1}{2\pi\sqrt{LC}}. \tag{13}$$

Values of L and C to form the impedance Z can be determined by solving equation (12) and equation (13) simultaneously.

With the foregoing analysis, Mode 1 operation, as illustrated in the graphs 200, may be achieved when the switching frequency is below the maximum designed switching frequency $f_{s,maxn}$. In Mode 1, the output is regulated by varying the switching frequency $f_s$ based on the control frequency $f_{PI}$ and the phase shift θ is generated by applying equation (10) to the converter gain M.

Equations (2) and (4) show that the average output current $I_{o2}$ is at its maximum value when the switching frequency is at its minimum $f_{s,min}$, and the average output current $I_{o2}$ is at its minimum value when the switching frequency is at its maximum value $f_{s,max}$. The maximum switching frequency $f_{s,max}$ is a pre-determined value defined based on hardware specifications of the converter topology 132.

Conventional power converters implement burst mode operation when output currents falls below a minimum value. However, burst mode can create unacceptable ripple and EMI that exceed regulatory requirements. When the converter gain M is varied over wide voltage ranges, the power conversion apparatus 100 may be pushed to deliver power levels above its rated output power, and the burst mode operating range can shift to higher power levels often into the converter's medium operating range. When burst mode starts at higher current levels, reliability of the switching devices decreases leading to possible converter failure. Therefore, it is desirable to eliminate burst mode operation.

The exemplary controller 110 beneficially avoids use of burst mode and instead employs a second control mode, referred to herein as Mode 2. During Mode 1, the inductor current $i_L$ is nearly sinusoidal and the duty cycle D of the switching networks is set to fifty percent as illustrated in Graphs 200. In contrast, the inductor current $i_L$ during Mode 2 becomes piece-wise linear and behaves in two different patterns leading to two sub-modes.

Figure 4:
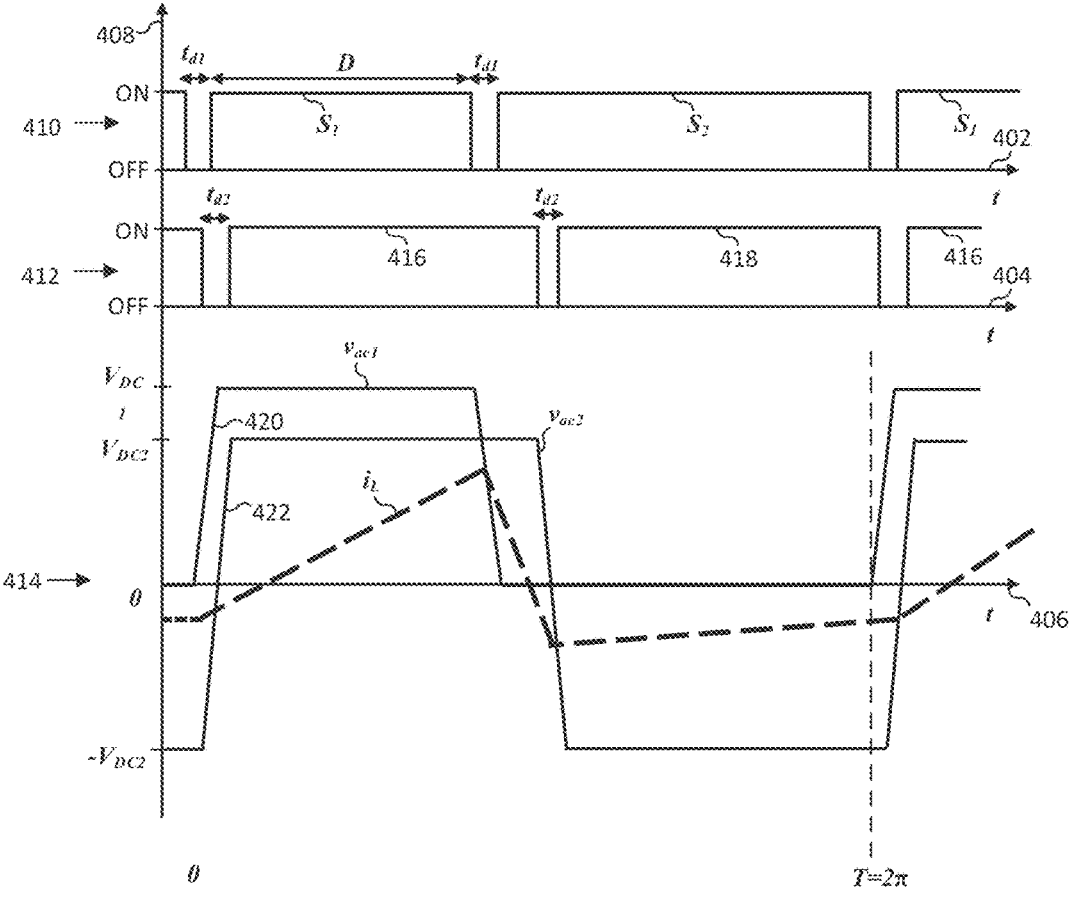
FIG. 4 illustrates graphs showing key operating waveforms of an exemplary series-resonant DC-DC power converter topology during a second operating mode with power flow from the HV-side to the LV-side incorporating aspects of the embodiments.

FIG. 4 illustrates graphs 400 showing key operating waveforms of an exemplary series-resonant DC-DC power converter topology 132 during a second operating mode with power flow from the HV-side 128 to the LV-side 130 of the converter. In the graphs 400, time is depicted along the horizontal axes 402, 404, 406 increasing to the right and signal magnitude is depicted along the vertical axis 408 increasing upwards. The ON and OFF state of switching devices $S_1$ and $S_2$ of the half bridge switching network 102 are depicted in graph 410, and the ON and OFF state of switching devices $S_3$, $S_4$, $S_5$, and $S_6$ of the high frequency switching network 104 are depicted in graph 412, where 416 represents the on state of switching devices $S_3$ and $S_6$ and 418 represents the on state of switching devices $S_4$ and $S_5$.

Graph 414 depicts the first AC voltage $v_{ac1}$, the second AC voltage $v_{ac2}$, and the inductor current $i_L$ during one full cycle of the switching networks, where the cycle is indicated along the time axis 406 starting at time 0 and ending at time T. The first AC voltage $v_{ac1}$ is generated by the half bridge switching network 102 and varies between zero and the first DC voltage $V_{DC1}$, while the second AC voltage $v_{ac2}$ varies between plus and minus the second DC voltage $V_{DC2}$.

Figure 5:
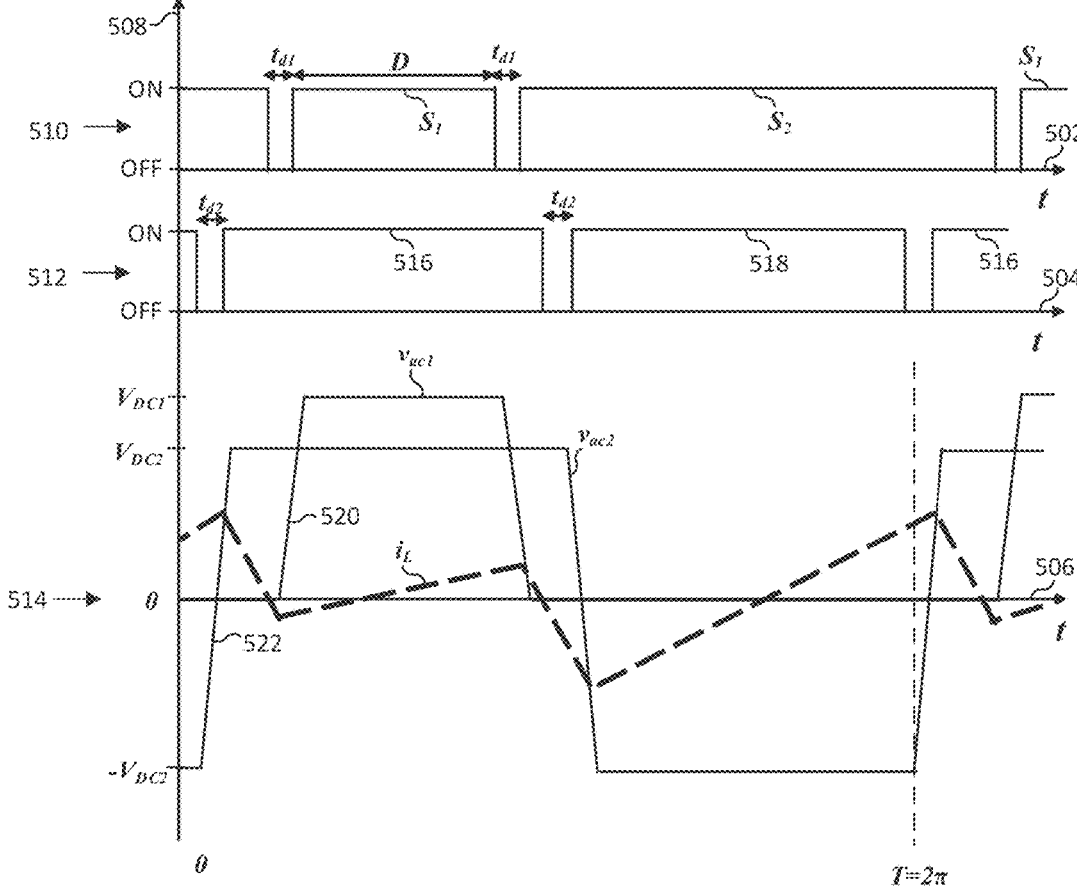
FIG. 5 illustrates graphs showing a second possible set of key operating waveforms of an exemplary series-resonant DC-DC power converter topology during a second operating mode with power flow from the HV-side to the LV-side incorporating aspects of the embodiments.
Figure 5:

FIG. 5 illustrates graphs 500 showing a second possible set of key operating waveforms of an exemplary series-resonant DC-DC power converter topology 132 during a second operating mode with power flow from the HV-side 128 to the LV-side 130 of the converter. In the graphs 500, time is depicted along the horizontal axes 502, 504, 506 increasing to the right and signal magnitude is depicted along the vertical axis 508 increasing upwards. The ON and OFF state of switching devices $S_1$ and $S_2$ of the half bridge switching network 102 are depicted in graph 510, and the ON and OFF state of switching devices $S_3$, $S_4$, $S_5$, and $S_6$ of the high frequency switching network 104 are depicted in graph 512, where 516 represents the on state of switching devices $S_5$ and $S_6$ and 518 represents the on state of switching devices $S_4$ and $S_5$.

Graph 514 depicts the first AC voltage $v_{ac1}$, the second AC voltage $v_{ac2}$, and the inductor current $i_L$ during one full cycle of the switching networks, where the cycle is indicated along the time axis 506 starting at time 0 and ending at time T. The first AC voltage $v_{ac1}$ is generated by the half bridge switching network 102 and varies between zero and the first DC voltage $V_{DC1}$, while the second AC voltage $v_{ac2}$ varies between plus and minus the second DC voltage $V_{DC2}$.

In contrast with the near sinusoidal inductor currents produced during the first operating mode and illustrated in Graphs 200 above, the reduced inductor current $i_L$ flowing during Mode 2 results in a piece-wise linear inductor $i_L$ current as illustrated in graphs 414 and 514.

The second control mode is engaged when the control frequency $f_{sPI}$ equals or exceeds the maximum switching frequency $f_{s,max}$. While in the second control mode, the switching frequency $f_s$ is set equal to the maximum switching frequency $f_{s,max}$, the converter phase shift $θ_s$ is set to the control phase shift $θ_{PI}$, and the converter duty cycle $D_s$ is set to the control duty cycle $D_{PI}$, where the control duty cycle $D_{PI}$ and the control phase shift $θ_{PI}$ are generated based on the control signal c produced by the control algorithm 126. When desired, the control duty cycle $D_{PI}$ and the control phase shift $θ_{PI}$ may be generated by applying linear functions $D_m$, $θ_m$ to the control duty cycle $D_{PI}$, and the control phase shift $θ_{PI}$ respectively.

As illustrated in Graphs 400 and Graphs 500, varying both the converter phase shift $θ_s$ and the converter duty cycle $D_s$ results in piece-wise linear inductor current $i_L$ leading to two sub-modes. When the rising edge of the first AC voltage 420 leads the rising edge of the second AC voltage 422 a first sub-mode occurs as illustrated in graph 414. A second sub-mode occurs when the rising edge of the first AC voltage 520 trails the rising edge of the second AC voltage 522 as illustrated in graph 514.

In the second operating mode illustrated in Graphs 400 and 500, minimum rms current cannot be maintained because it is not possible to adhere to the relationship given in equation (10). However, ZVS is maintained due to the converter gain being less than the maximum gain $M<M_{max}$.

During the first sub-mode illustrated in Graphs 400, the LV-side switching devices do undergo hard switching, while for the second sub-mode illustrated in Graphs 500, all LV-side switching devices operate with ZVS. This second sub-mode illustrated in Graphs 500 generally occurs at lower power levels and therefore does not have a significant impact on the converter's performance.

In the exemplary controller 110, this second control mode is engaged when the control frequency $f_{sPI}$ is equal to or greater than the maximum switching frequency $f_{s,max}$. The mode signal x output by the comparator 124 under this condition is true or a logical 1 resulting in the switching frequency $f_s$ being set 120 to the maximum frequency $f_{s,max}$, the phase shift $\theta_s$ being set to the control phase shift $\theta_{PI}$, and the duty cycle $D_s$ to be set to the control duty cycle $D_{PI}$.

The control schemes described above and performed by the exemplary controller 110 may be implemented using any appropriate hardware, software, or combination thereof and may include both analog and digital circuitry as desired. For example, the controller 110 may be implemented using a microcontroller (MCU) or other computing or processing device, or the controller 110 may be implemented based on any appropriate combination of digital and/or analog circuitry as desired.

Referring to FIG. 6 there can be seen a flow chart of an exemplary method 600 for operating a series-resonant DC-DC power converter topology such as the bi-directional series-resonant DC-DC power converter topology 132 described above and with reference to FIG. 1. The exemplary method 600 of the embodiments is directed to a method for applying a multi-mode control strategy to achieve bi-directional power flow in a series resonant DC-DC power conversion apparatus. The method 600 uses one control mode ensure ZVS operation and regulate converter output while the converter is operating within a variable range of switching frequencies, and a second control mode to eliminate burst operation while the converter is operating at its maximum switching frequency.

In one embodiment the power conversion apparatus includes a series resonant circuit composed of a series connected inductor, capacitor, and a primary winding of a transformer. The apparatus further includes a half bridge switching circuit coupled between the series resonant circuit and a first DC voltage, and a full bridge switching circuit coupled between a secondary winding of the transformer and a second DC voltage.

The method generates 602 an error signal e by subtracting a controlled voltage $V_C$ from a reference voltage $V_{ref}$. The controlled voltage is the actual converter output which may be either one of the first DC voltage $V_{DC1}$ or the second DC voltage $V_{DC2}$ depending on the desired direction of power flow. The reference voltage $V_{ref}$ is a signal or set point that represents a desired output of the converter.

Bi-directional converter operation is achieved through selection of the controlled voltage. When forward power flow is desired, power is flowing from the first DC voltage $V_{DC1}$ to the second DC voltage $V_{DC2}$, the method 600 sets the controlled voltage $V_C$ equal to the second DC voltage $V_{DC2}$. When reverse power flow is desired, power is flowing from the second DC voltage $V_{DC2}$ to the first DC voltage $V_{DC1}$, the method 600 sets the controlled voltage $V_C$ to the first DC voltage $V_{DC1}$, and inverts the converter phase shift $\theta_s$.

A control signal is generated 604 by applying a control algorithm to the error signal e. In one embodiment the control algorithm includes a proportional plus integral control algorithm. Alternatively, any suitable type of loop compensation may be advantageously employed as the control algorithm. When desired, a control algorithm gain $K_m$ may be applied to the control algorithm. In one embodiment it is beneficial to select a different value for the control algorithm gain $K_m$ based on a comparison between the control frequency $f_{sPI}$ and the maximum switching frequency $f_{s,max}$.

The method generates 606 a control frequency $f_{sPI}$, a control duty cycle $D_{PI}$, and a control phase shift $\theta_{PI}$ based on the control signal c. when desired various linear operations may be applied to the control signal c to generate the control frequency $f_{sPI}$, the control duty cycle $D_{PI}$, and the control phase shift $\theta_{PI}$ as a matter of design choice.

A converter operating mode is selected based on a comparison 608 of the control frequency $f_{sPI}$ and a pre-determined maximum switching frequency $f_{s,max}$. The pre-determined maximum switching frequency $f_{s,max}$ may be selected based on specifications of components within the series-resonant DC-DC power converter topology being controlled by the method 600.

When the control frequency $f_{sPI}$ is greater than the predetermined maximum switching frequency $f_{s,max}$, the method 600 sets 610 a converter switching frequency $f_s$ equal to the maximum switching frequency $f_{s,max}$, sets 612 the converter phase shift $\theta_s$ to the control phase shift $\theta_{PI}$, and sets 614 the converter duty cycle $D_s$ to the control duty cycle $D_{PI}$. Fixing the switching frequency at the maximum switching frequency $f_{s,max}$ allows the controller to avoid burst mode and regulate the converter output by varying the converter phase shift $\theta_s$ and the converter duty cycle $D_s$.

When the control frequency $f_{sPI}$ is less than the predetermined maximum switching frequency $f_{s,max}$, the controller regulates the converter output by varying the switching frequency. In this operating mode, the converter sets 616 the switching frequency $f_s$ equal to the control frequency $f_{sPI}$, and sets 618 the converter duty cycle $D_s$ to a constant value of fifty percent (50%).

Efficient converter operation requires ZVS switching during at least medium and high load operation. To ensure ZVS operation, the method 600 generates 620 a converter gain M based on the first DC voltage $V_{DC1}$, the second DC voltage $V_{DC2}$, and a turns ratio N of the transformer T. A converter phase shift $\theta_s$ is generated 622 based on the converter gain M.

As described above, equation (10) may be used to determine the appropriate converter phase shift $\theta_s$ based on the converter gain M. A maximum gain $M_{max}$ is determined based on a deadtime $t_{d1}$ of the high voltage switching network 102, a charge stored in an output capacitance $C_{oss}$ of a high voltage side switching device $S_1$, and a minimum low voltage side output current necessary to provide zero voltage switching. When the converter gain M is less than the maximum gain $M_{max}$, the method 600 generates 622 the converter phase shift $\theta_s$ based on an inverse cosine of the converter gain $\cos^{-1}$ M.

Once the converter switching frequency $f_s$, converter duty cycle $D_s$, and converter phase shift $\theta_s$ have been generated, switch control signals $S'_1$, $S'_2$, $S'_3$, $S'_4$, $S'_5$, $S'_6$ are generated 624 based on the converter switching frequency $f_s$, the converter phase shift $\theta_s$, and the converter duty cycle $D_s$. The switch control signals $S'_1$, $S'_2$, $S'_3$, $S'_4$, $S'_5$, $S'_6$ are configured as described above to operate the first switching network 102 and the second switching network 104 to transfer power between the first DC voltage $V_{DC1}$ and the second DC voltage $V_{DC2}$.

Thus, while there have been shown, described and pointed out, features of the embodiments as applied to the examples thereof, it will be understood that various omissions, substitutions and changes in the form and details of devices and methods illustrated, and in their operation, may be made by those skilled in the art without departing from the spirit and scope of the embodiments. Further, it is expressly intended that all combinations of those elements, which perform substantially the same function in substantially the same way to achieve the same results, are within the scope of the embodiments. Moreover, it should be recognized that structures and/or elements shown and/or described in connection with any form or embodiment of may be incorporated in any other described or suggested form or embodiment as a general matter of design choice.

What is claimed is:

1. An apparatus, comprising:
a series resonant circuit, the series resonant circuit comprising a series connected inductor, capacitor, and a primary winding of a transformer;
a half bridge switching circuit coupled between the series resonant circuit and a first DC voltage;
a full bridge switching circuit coupled between a secondary winding of the transformer and a second DC voltage; and
a controller configured to:
  receive the first DC voltage, the second DC voltage, and produce switch control signals, wherein the switch control signals are configured to operate a first switching network and a second switching network to transfer power between the first DC voltage and the second DC voltage,
  subtract a controlled voltage from a reference voltage to produce an error signal, wherein the controlled voltage is one of the first DC voltage and the second DC voltage;
  apply a control algorithm to the error signal to produce a control signal;
  generate a control frequency, a control duty cycle, and a control phase shift, based on the control signal; and
  generate the switch control signals based on a switching frequency, a converter phase shift, and a converter duty cycle,
  wherein when the control frequency is greater than a predetermined maximum switching frequency the controller is further configured to:
  set the switching frequency equal to the maximum switching frequency;
  set the converter phase shift to the control phase shift; and
  set the converter duty cycle to the control duty cycle.

2. The apparatus according to claim 1, wherein the controller duty cycle is less than fifty percent.

3. The apparatus according to claim 1, wherein,
when power is flowing from the first DC voltage to the second DC voltage, the controlled voltage is set equal to the second DC voltage, and
when power is flowing from the second DC voltage to the first DC voltage, the controlled voltage is set equal to the first DC voltage and the converter phase shift is inverted.

4. The apparatus according to claim 1, wherein the control algorithm comprises a proportional plus integral control algorithm.

5. The apparatus according to claim 1, wherein the controller is configured to generate the control frequency, the control duty cycle, and the control phase shift by applying one or more linear functions to the control signal.

6. The apparatus according to claim 1, wherein the controller is configured to determine a control algorithm gain based on a comparison between the control frequency and the maximum switching frequency.

7. The apparatus according to claim 1, wherein the controller is configured to generate a converter gain based on the first DC voltage, the second DC voltage, and a turns ratio of the transformer, and, when the control frequency is less than the maximum switching frequency:
  set the switching frequency equal to the control frequency;

set the converter duty cycle to fifty percent; and
generate the converter phase shift based on the converter gain.

8. The apparatus according to claim 7, wherein when the converter gain (M) is less than a predetermined maximum gain, the converter phase shift is set to an inverse cosine of the converter gain.

9. The apparatus according to claim 8, wherein the maximum gain is determined based on a deadtime of a high voltage switching network, a charge stored in an output capacitance of a high voltage side switch, and a minimum low voltage side output current necessary to provide zero voltage switching.

10. A method, comprising:
a series resonant circuit, the series resonant circuit comprising a series connected inductor, capacitor, and a primary winding of a transformer;
a half bridge switching circuit coupled between the series resonant circuit and a first DC voltage; and
a full bridge switching circuit coupled between a secondary winding of the transformer and a second DC voltage;
wherein the method further comprises:
generating an error signal by subtracting a controlled voltage from a reference voltage, wherein the controlled voltage is one of the first DC voltage, and the second DC voltage;
generating a control signal by applying a control algorithm to the error signal;
generating a control frequency, a control duty cycle, and a control phase shift, based on the control signal; and
comparing the control frequency to a predetermined maximum switching frequency,
when the control frequency is greater than the predetermined maximum switching frequency, the method further comprises:
setting a converter switching frequency equal to the maximum switching frequency;
setting a converter phase shift to the control phase shift;
setting a converter duty cycle to the control duty cycle; and
generating switch control signals based on the switching frequency, the converter phase shift, and the converter duty cycle,
wherein the switch control signals are configured to operate a first switching network and a second switching network to transfer power between the first DC voltage and the second DC voltage.

11. The method according to claim 10, wherein the duty cycle is less than fifty percent.

12. The method according to claim 10, further comprising:
when power is flowing from the first DC voltage to the second DC voltage, the method further comprises setting the controlled voltage equal to the second DC voltage, and
when power is flowing from the second DC voltage to the first DC voltage, the method further comprises setting the controlled voltage to the first DC voltage, and inverting the converter phase shift.

13. The method according to claim 10, wherein the control algorithm comprises a proportional plus integral control algorithm.

14. The method according to claim 10, wherein the control frequency, the control duty cycle, and the control phase shift are generated by applying one or more linear functions to the control signal.

15. The method according to claim 10, wherein the control algorithm comprises a control algorithm gain, and the method further comprises determining the control algorithm gain based on a comparison between the control frequency and the maximum switching frequency.

16. The method according to claim 10, wherein when the control frequency is less than the predetermined maximum switching frequency, the method further comprises:

setting the switching frequency equal to the control frequency;

setting the converter duty cycle to fifty percent;

generating a converter gain based on the first DC voltage, the second DC voltage, and a turns ratio of the transformer; and generating the converter phase shift based on the converter gain.

17. The method according to claim 16, further comprising:

determining a maximum gain based on a deadtime of a high voltage switching network, a charge stored in an output capacitance of a high voltage side switch, and a minimum low voltage side output current necessary to provide zero voltage switching; and when the converter gain is less than the maximum gain, generating the converter phase shift based on an inverse cosine of the converter gain.

18. The method according to claim 17, wherein the maximum gain is determined based on a deadtime of the high voltage switching network, a charge stored in an output capacitance of a high voltage side switch and a minimum low voltage side output current necessary to provide zero voltage switching.

\* \* \* \* \*